May 10, 1927.
M. C. LYDDANE
1,628,253
ANCHORING DEVICE
Filed Dec. 2, 1925
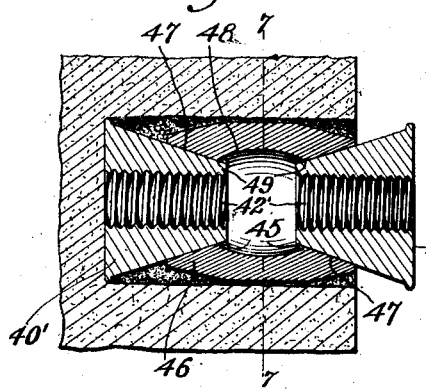
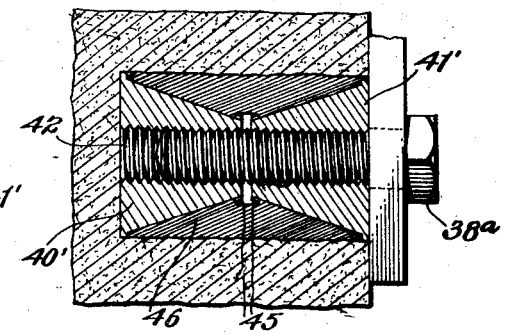
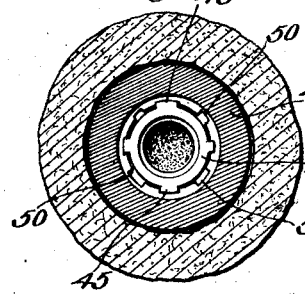
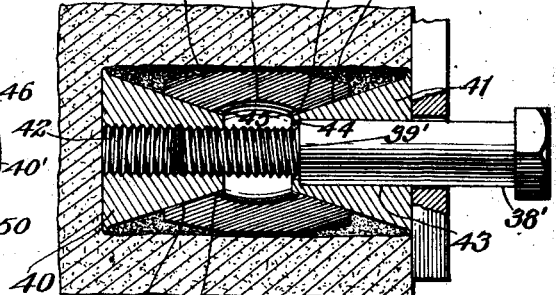
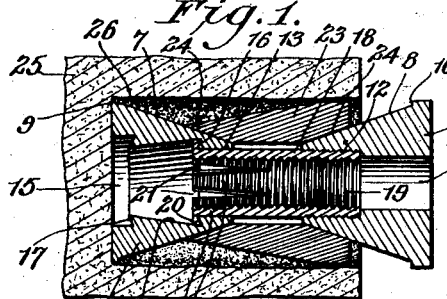
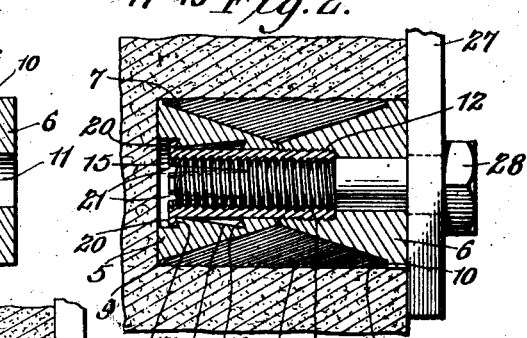
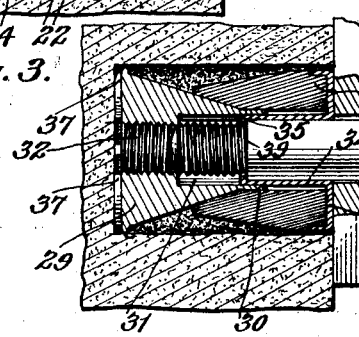
Inventor
M. C. Lyddane Patented May 10, 1927.

1,628,253

UNITED STATES PATENT OFFICE.

MORTIMER CARLISLE LYDDANE, OF YONKERS, NEW YORK.

ANCHORING DEVICE.

Application filed December 2, 1925. Serial No. 72,686.

My present invention relates to anchoring devices of the type employed for the purpose of fixedly securing or anchoring screws, bolts and analogous fastening elements in concrete and other masonry structures.

It is the primary object of my present improvements to provide a device for the above purpose embodying an expanding member of hard metal and an expansible member of relatively soft metal together with novel means for retaining said members in their initially assembled positions relative to each other. These members are so formed and correlated that when said members are relatively moved under pressure a uniform radial expanding force is exerted upon said expansible member. The retaining means referred to includes coacting parts connected with each of said members and is characterized by the fact that said parts, during the expanding action, bear a constant fixed relation to the respective members.

It is another feature of my invention, in one embodiment thereof, to provide an expansible metal sleeve the bore of which is flared at its opposite ends, and spaced expanding members engaged in said ends of the bore and operating under the application of pressure to progressively expand the sleeve radially from its ends to the center thereof.

It is another object of my improvements to provide a means for retaining said two expanding members and the expansible sleeve in initially assembled relation and for also positively locking said expanding members to each other after the sleeve has been expanded.

In general, it is the aim of my invention to provide an anchoring device having the above mentioned novel features, among others, which, nevertheless, will be of simple construction and wherein the several parts may be easily and quickly assembled and the anchoring operation expeditiously performed.

With the above and other objects in view the invention consists in the improved anchoring device and in the form, construction and relative arrangement of the various elements as will be hereinafter more fully described, illustrated in the accompanying drawing and subsequently incorporated in the subjoined claims.

In the drawing, wherein I have shown several simple and practical embodiments of the invention and in which similar reference characters designate corresponding parts throughout the several views:

Figure 1 is a longitudinal sectional view illustrating one embodiment of my new anchoring device showing the same arranged in place before expansion.

Figure 2 is a similar view showing the device after expansion of the anchoring member.

Figure 3 is a longitudinal section showing a modified form of the device having a single expanding member.

Figure 4 is a similar section illustrating a modification of the double expansion form of the device shown in Figure 1.

Figures 5 and 6 are similar sectional views showing another alternative form of the device before and after expansion, respectively.

Figure 7 is a sectional view taken substantially on the line 7—7 of Figure 5.

Referring more particularly to Figures 1 and 2 of the drawing, the embodiment of my invention therein illustrated includes two expanding members 5 and 6 respectively, the member 6 also constituting an impact receiving element. Each of these members is formed of a relatively hard metal and has a longitudinally tapering or conically shaped peripheral surface, 7 and 8 respectively. Preferably, the member 5 is provided at its larger end with an annular bead or flange 9, while the corresponding end of the member 6 is formed with the annular shoulder 10.

The member 6 is formed with an axial bore 11 which is counterbored at the smaller end of said member and threaded as at 12. The other member 5 also has an axially extending bore which includes a relatively short section 13 at the smaller end of said member, a longer, longitudinally tapering intermediate section 14, and a second short end section 15. The tapered section 14 at its larger end is connected with the bore section 13 by an annular, obliquely inclined, shoulder 16 and at its other end is connected with the bore section 15 by a similar shoulder 17.

As will be later explained, the two expanding members are adapted to be connected in permanently assembled relation with an expansible member by means of a sleeve 18. This sleeve is preferably formed of hardened steel and is internally threaded throughout its length as at 19. At one of its ends said sleeve is also provided with external threads for engagement in the threaded counterbore 12 of the member 6. At its other end the sleeve is formed with an outwardly projecting flange 20 and is longitudinally split at spaced points, as shown at 21, to provide a series of resiliently moveable tongues 22. The inner face of the flange 20 on each of these tongues is inclined similarly to the shoulders 16 and 17 and the outer edges of said flanges are also slightly bevelled.

As herein shown, the expansible member 23 is in the form of a sleeve of lead or other comparatively soft metal. This member may be of any desired predetermined sectional form or shape and preferably has the opposite ends of its bore flared or tapered to snugly receive the smaller ends of the expanding members 5 and 6, as indicated at 24.

The several parts of the device are permanently assembled prior to use, so that they may be handled as a single unit, in the following manner: The sleeve 18 is first threaded into the counterbore 12 of the expanding member 6. The expansible member 23 is then inserted over the sleeve 18 until one end 24 of its bore seats upon the tapered surface 8 of said expanding member. Finally, the smaller end of the other expanding member 5 is inserted into the other end of the expansible member and sufficient pressure is applied to cause the member 5 to coact with the flanges 20 and force the spring tongues 22 inwardly so that said flanges may pass through the bore section 13 of the expanding member. Thereupon, the tongues resume their normal relative positions and the flanges 20 thereof interlock with the internal shoulder 16 of the expanding member. At this time the tapered surface 7 of the member 5 will be in close contact with the surface 24 of the expansible member. In this manner it will be apparent that the three primary elements are held in properly assembled relation and may be handled in large quantities, as in packing for shipment, without liability of accidental separation of the parts.

In the use of the device, the wall or floor 25 of concrete or other masonry is first provided with a mortise 26 of the required depth. The anchoring device is then inserted therein with the expanding member 5 in contact with the base of the mortise and the member 6 projecting beyond the open end thereof, as seen in Figure 1 of the drawing. The workman now strikes several sharp blows upon the end of the member 6 with a suitable hammer thereby forcing said member inwardly and causing the inner end of the expansible member 23 to move upon the tapering face 7 of the expanding member 5. Thus the member 23 is radially expanded against the wall of the mortise 26 and as the resistance to its longitudinal movement increases the impact receiving member 6 also exerts a radial expanding force against the outer end of said expansible member. Thus the soft metal sleeve is simultaneously subjected to expanding pressures acting progressively from its opposite ends to the center thereof. During this expanding operation the flanges 20 ride against the tapered surface 14 of the member 5 so that the split end of the sleeve 18 is contracted. At the completion of the expanding movement of the member 6 and when it is substantially flush with the face of the floor or wall, as shown in Figure 2, said tongues resume their normal positions and the flanges are engaged behind the shoulder 17 of the expanding member 5. The two expanding members are thus positively connected and interlocked with each other and the possibility of their independent axial movement with respect to the body of expanded metal is precluded. It will be apparent that by the provision of the members 5 and 6 having opposed tapering surfaces simultaneously coacting with the expansible element, the pressure forces causing said soft metal element to interlock with the irregularities of the mortise wall will be more uniformly distributed than would be the case if only the member 5 were employed.

After the device has thus been applied and secured in position, the part to be held, indicated at 27, is arranged in position over the end of the member 6 and the bolt 28 inserted through an opening in said part and through the bore 11 and threaded into the sleeve 18 until the bolt head is tightly engaged against said part. Since the device above described is capable of resisting the most severe tensile strains the bolt will thereby be fixedly anchored in place.

I have referred to the sleeve 18 as having a threaded connection with the member 6 but it will be understood that any other desired means may be employed for effecting a permanent connection between these parts. Also other means than the sleeve 18 might be provided for the purpose of retaining the members 5 and 6 in assembled relation with the expansible member 23 and one such alternative means I shall presently describe.

In Figure 3 of the drawing I have shown a form of my invention in which only a single expanding member 29 is employed. This member is of the same general conical form as the members 5 and 6 but is provided at its smaller end with a longitudinal extension 30 to form a continuation of the bore 31. The other end of this bore is reduced and threaded, as at 32. One end of a hard metal sleeve has a driving frictional fit in the outer end of the bore 31 when the member 29 is inserted into the flaring end of the bore of the soft metal expansible member 33. This sleeve 34 has a narrow inwardly extending flange 35 formed on said end thereof and at its other end is provided with an outwardly projecting flange 36 which extends over the end face of the member 33 and is permanently fixed thereto. In this construction the bottom face of the member 29 is preferably provided with a number of radial ribs 37 to grip the base wall of the mortise and prevent turning movement of said member. The bolt 38 to be used in connection with this form of the device is provided with a shoulder 39 at the inner end of its threaded portion.

It will be seen that the expanding and expansible members are held in their initially assembled positions by the rigid sleeve 34 and that since this sleeve is enclosed within the expansible member which also partially encloses the expanding member, the composite unit will be of minimum length. In this case the expansion of the member 33 is automatically effected as the attaching bolt 38 is threaded home. Thus after the device is arranged in the mortise and the part to be secured positioned over the outer end thereof, the bolt 38 is inserted and as the threaded end 31 thereof engages the thread 32 of the member 29 the shoulder 39 on said bolt comes into bearing contact with the flange 35 on the sleeve 34 and forces said sleeve under pressure into the bore 31 of the expanding member. The expansible member 33 is thereby moved on the expanding member 29 and is radially expanded against the wall of the mortise. When the member 33 has been fully expanded the bolt head is in tight contact with the part. Of course, the end flange 36 of the sleeve 34 will also be spaced inwardly from the face of the wall, but in many cases this is not objectionable.

In Figures 4 to 7 inclusive of the drawing I have illustrated another means for interlocking the spaced expanding members in their initially assembled positions with the interposed expansible member wherein a direct interlocking connection of each of the expanding members with the expansible member is automatically produced.

As shown in Figure 4 the two expanding members 40 and 41 are of the same general external form as the members 5 and 6. In this case, however, the member 40 has a threaded bore 42 extending the entire length thereof while the member 41 has a smooth unthreaded bore 43. At the smaller end of the latter member the bearing flange 44 is formed. In the construction illustrated in Figure 5 both of the expanding members 40' and 41' are provided with the continuously threaded axial bores 42'. In each of these alternative embodiments of my invention each of the expanding members is formed at the smaller end thereof and upon its outer face with a series of spaced radially projecting lugs or teeth 45 which are of relatively different widths, as clearly seen in Figure 7 of the drawing.

As in the construction first described the two expanding members are adapted to be initially assembled with an interposed expansible member 46. I have shown this member of somewhat different form from the member 23 but provided with the internal flared seats 47 at its opposite ends to receive the small ends of the respective expanding members. Between these seats the expansible sleeve is reamed out to provide the annular concave wall 48, which, at its juncture with the inner ends of the seats 47, forms the sharp edges indicated at 49.

In assembling the parts, the expanding members are forced into the ends of the soft metal sleeve 46 under sufficient pressure to cause the teeth 45 to cut shallow grooves in the inner ends of the seats 47, as indicated at 50 in Figure 7. When the expanding members are engaged with the respective seats and the teeth 45 thereof positioned beyond the edges 49 said members and the expansible sleeve are then given a relative rotation which disaligns the teeth 45 and the grooves 50. The three members are thus directly and permanently interlocked with each other as the chances are very remote that the teeth will ever accidentally come into registration with the proper grooves so as to permit the parts to be separated.

In the construction of Figure 4 the member 46 is automatically expanded by means of the attaching bolt as in Figure 3, but requires a relatively long bolt 38' having the shoulder 39' to bear upon the flange 44 of the expanding member 41. In the form shown in Figure 5 the bolt 38ª has its shank threaded for substantially its entire length for engagement with the threaded bores of both expanding members. In the latter case the expansion of the member 46 is effected by impact of the hammer upon the expanding member 41' as in the construction first described. After expansion, as shown in Figure 6, the metal of sleeve 46 is interlocked with the teeth 45 thereby preventing relative turning movement of the parts. If desired, in this form of the device, the threads may be omitted from the member 41'. Also, the expanding members may be of such length that when the sleeve is fully expanded the opposed ends of said members will be in contact with each other, as in Figure 2. However, the thickness of the intermediate wall section of the sleeve is accurately calculated to obviate the possibility of the sleeve metal entering between the ends of the expanding members during the expanding action.

From the foregoing description taken in connection with the accompanying drawing the construction and manner of use of the several illustrated embodiments of my invention will be fully understood. It will be noted that they possess the common characteristic that the expansible member and the expanding member or members are fixedly held against relative separation in their initially assembled positions by means of parts which automatically co-operate with each other in the act of assembling said members. I am aware of the fact that it has heretofore been proposed to provide means for retaining such expanding and expansible members in assembled relation, consisting, in one case, of a ramming sleeve frictionally fitted on an extension of the expanding member, and in another of such a sleeve having resilient, expansible tongues interlocked with one end of the expanding member. However, in both of these prior art devices an additional operation is required after the expansible and expanding members have been assembled in order to effect the connection of the retaining means. It will also be apparent that by providing two rigid expanding members, simultaneously and independently applying radial expanding pressure upon the opposite ends of the soft metal sleeve, I obtain a more uniform interengaging anchorage between the outer side of the sleeve throughout its length and the wall or floor structure than is possible with such devices having a single expanding member acting upon the expansible member.

In the above description I have referred to several practical examples of my present improvements. No unnecessary limitations are to be implied therefrom as it is possible that the essentials of my invention might also be exemplified in other structural forms. Accordingly, the right is reserved to incorporate such improvements in the various alternative embodiments thereof as may fairly be comprehended within the scope and spirit of the appended claims.

What I claim is:

1. An anchoring device comprising a rigid expanding member and a soft metal expansible member adapted to be assembled in coaxially extending relation to each other by a relative axial movement of said members so that one end of the expanding member is disposed in expanding contact with an opposed end of the expansible member without distorting the latter, and means operating concurrently with such assemblage of said members whereby they are permanently connected with each other in the form of a composite unit.

2. An anchoring device comprising a rigid expanding member and a soft metal expansible member adapted to be assembled in coaxially extending relation to each other by a relative axial movement of said members so that one end of the expanding member is disposed in expanding contact with an opposed end of the expansible member without distorting the latter, and parts bearing a fixed relation to the expanding and expansible members respectively, automatically positioned for co-operation with each other in the act of assembling said members, to retain the latter in such assembled relation in the form of a composite unit.

3. An anchoring device comprising a tubular, non-elastic, radially expansible member, having a circumferentially continuous wall, an expanding member adapted to be initially assembled in expanding relation to said expansible member by relative axial movement of said members to position an end of the expanding member within one end of said expansible member, while maintaining the normal form of the latter member, and said members having means cooperatively engaged by such assembly thereof to inseparably connect said members in the form of a composite unit.

4. An anchoring device comprising a tapering hard metal expanding member, a soft metal expansible member initially assembled upon the expanding member in longitudinally projecting relation thereto and with one end of said expansible member enclosing the smaller end of the expanding member each of said members having a wall structure uninterrupted in cross-section and means bearing a fixed relation to said members operative when they are so assembled without alteration in form of the expansible member to prevent disconnection of said members but permitting the expansible member and the expanding member to move longitudinally relative to each other whereby the expansible member is expanded.

5. An anchoring device comprising a hard metal expanding member, a soft metal expansible member, each of said members having a longitudinal bore and said expanding member having one of its ends initially engaged in one end of the bore of said expansible member said latter member having a circumferentially continuous wall, one of said members adapted to be moved longitudinally relative to the other member to thereby expand said expansible member, and means movable with said movable member adapted to coact with internal means on the other member without expanding the expansible member to retain said members in their initially assembled relative positions as a composite unit.

6. An anchoring device comprising a hard metal expanding member, a soft metal expansible member, each of said members having a longitudinal bore and said expanding member having one of its ends initially engaged in one end of the bore of said expansible member, said expansible member adapted to be moved under pressure upon said expanding member and thereby expanded, and means movable with said expansible member received in the bore of said expanding member and coacting with the wall thereof when said members are initially assembled to retain said members in such assembled relative positions as a composite unit.

7. An anchoring device comprising a hard metal expanding member having a longitudinal bore, an impact receiving member, a soft metal expansible member, and means carried by said impact receiving member adapted to engage in the bore of said expanding member and coact with the wall thereof to retain said expansible member in initially assembled relation with said expanding member and the impact receiving member.

8. An anchoring device comprising a hard metal expanding member having a longitudinal bore, an impact receiving member, a soft metal expansible member, and means carried by said impact receiving member adapted to engage in the bore of said expanding member and coact with the wall thereof to retain said expansible member in initially assembled relation with said expanding member and the impact receiving member, said expanding member having a part engaged by said means after expansion of said expansible member to prevent relative axial movement of said expanding and impact receiving members and thereby maintain said expansible member under maximum expanding pressure.

9. An anchoring device comprising a hard metal expanding member having a longitudinal bore provided with a shoulder, a soft metal expansible member, and an impact receiving member provided with means to extend into said bore and interlockingly engage said shoulder and retain said member in initially assembled relation with the expanding and expansible members.

10. An anchoring device comprising a hard metal expanding member having a longitudinal bore provided with spaced shoulders, a soft metal expansible member, and an impact receiving member provided with means to extend into said bore and interlockingly engage one of said shoulders and retain said member in initially assembled relation with the expanding and expansible members, said means interlocking with the other shoulder after expansion of said expansible member to prevent relative axial movement of said expanding and impact receiving members.

11. An anchoring device including a soft metal expansible member, two hard metal expanding members adapted to be initially assembled in spaced relation to each other and in expanding relation to the opposite ends of said expansible member, one of said expanding members being movable under pressure towards the other to expand said expansible member, and means carried by the expanding members for retaining the same in such assembled relation with the expansible member to form a composite unit.

12. An anchoring device including a soft metal expansible member, two hard metal expanding members adapted to be initially assembled in spaced relation to each other and in expanding relation to the opposite ends of said expansible member, one of said expanding members being movable under pressure towards the other to expand said expansible member, and means for retaining said members in such assembled relation including parts operative upon the completion of such expanding movement to prevent an axial separating movement of said expanding members.

13. An anchoring device including a soft metal expansible member, two hard metal expanding members adapted to be initially assembled in spaced relation to each other and in expanding relation to the opposite ends of said expansible member, one of the expanding members being movable under pressure towards the other to expand said expansible member, and means independent of the expansible member automatically operable at the end of such expanding movement to effect an interlocking connection between said expanding members and prevent an axial separating movement thereof.

14. An anchoring device including a hard metal expanding member, a soft metal expansible member, an impact receiving member adapted to impart relative axial movement to said expanding and expansible members to expand the latter, and means independent of the expansible member automatically operating at the end of the expanding movement of said impact receiving member to permanently fix the latter against an axial receding movement with respect to the expanding and expansible members.

In testimony that I claim the foregoing as my invention I have signed my name hereunder.

MORTIMER CARLISLE LYDDANE.